US012070942B2

(12) United States Patent
Yokozawa et al.

(10) Patent No.: US 12,070,942 B2
(45) Date of Patent: Aug. 27, 2024

(54) INKJET PRINTING APPARATUS, CONTROL METHOD THEREFOR, AND STORAGE MEDIUM

(71) Applicant: CANON KABUSHIKI KAISHA, Tokyo (JP)

(72) Inventors: Taku Yokozawa, Kanagawa (JP); Kazuhiko Sato, Tokyo (JP); Noboru Kunimine, Tokyo (JP); Takeshi Murase, Kanagawa (JP); Hiroshi Taira, Tokyo (JP); Hiroshi Kawafuji, Tokyo (JP); Sae Mogi, Kanagawa (JP); Akiko Aichi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 54 days.

(21) Appl. No.: 17/512,243

(22) Filed: Oct. 27, 2021

(65) Prior Publication Data

US 2022/0134738 A1 May 5, 2022

(30) Foreign Application Priority Data

Oct. 30, 2020 (JP) ................................ 2020-181985

(51) Int. Cl.
*B41J 2/045* (2006.01)

(52) U.S. Cl.
CPC ......... *B41J 2/04563* (2013.01); *B41J 2/0458* (2013.01)

(58) Field of Classification Search
CPC .. B41J 2/04563; B41J 2/0458; B41J 2/16526; B41J 29/38; B41J 2002/16564; B41J 2002/16573; B41J 2/04553; B41J 2/04598; B41J 29/393
See application file for complete search history.

(56) References Cited

U.S. PATENT DOCUMENTS

| | | | | |
|---|---|---|---|---|
| 2013/0100200 A1* | 4/2013 | Hamasaki | ............ | B41J 2/16526 347/23 |
| 2013/0135380 A1* | 5/2013 | Oonuki | .................... | B41J 29/38 347/17 |
| 2020/0031115 A1* | 1/2020 | Oonuki | ................ | B41J 2/04563 |

FOREIGN PATENT DOCUMENTS

| | | |
|---|---|---|
| JP | H09226125 A | 9/1997 |
| JP | H1016228 A | 1/1998 |
| JP | 2000190528 A | 7/2000 |
| JP | 2008188987 A | 8/2008 |

(Continued)

*Primary Examiner* — Jannelle M Lebron
(74) *Attorney, Agent, or Firm* — Canon U.S.A., Inc. I.P. Division

(57) ABSTRACT

An inkjet printing apparatus includes a print head configured to print an image on a printing medium using a printing element configured to eject ink with thermal energy, a scanning unit configured to cause the print head to scan the printing medium, and a control unit configured to control scanning by the scanning unit and image printing by the print head based on an image printing instruction, wherein the control unit performs a control operation including executing a preliminary ejection to eject, from the print head, ink that does not contribute to image printing before an image is printed in one scanning operation, and determining an amount of ink to be ejected in the preliminary ejection based on a difference between a target temperature and a scanning start temperature, which is a temperature of the print head acquired in response to an instruction to start the one scanning operation.

22 Claims, 12 Drawing Sheets

(56) References Cited

FOREIGN PATENT DOCUMENTS

| | | | |
|---|---|---|---|
| JP | 2009125983 | A | 6/2009 |
| JP | 2012240253 | A | 12/2012 |

* cited by examiner

FIG.9

| HUMIDITY | TARGET TEMPERATURE W°C | DIFFERENCE BETWEEN HEAD TEMPERATURE T°C AND TARGET TEMPERATURE W°C W – T | | | |
|---|---|---|---|---|---|
| | | – 0°C | – 5°C | – 10°C | 10°C – |
| LESS THAN 40% | 50°C | 8 EJECTIONS | 16 EJECTIONS | 32 EJECTIONS | 48 EJECTIONS |
| 40% OR MORE | 40°C | 8 EJECTIONS | 12 EJECTIONS | 24 EJECTIONS | 36 EJECTIONS |

FIG.11

| HUMIDITY | TARGET TEMPERATURE W°C | DIFFERENCE BETWEEN HEAD TEMPERATURE T°C AND TARGET TEMPERATURE W°C W − T | | | |
|---|---|---|---|---|---|
| | | ~ 0°C | ~ 5°C | ~ 10°C | 10°C ~ |
| LESS THAN 40% | 50°C | 0.762 µs | 0.823 µs | 0.883 µs | 0.914 µs |
| 40% OR MORE | 40°C | 0.762 µs | 0.800 µs | 0.838 µs | 0.876 µs |

INKJET PRINTING APPARATUS, CONTROL METHOD THEREFOR, AND STORAGE MEDIUM

BACKGROUND

Field

The present disclosure relates to an inkjet printing apparatus for printing an image on a printing medium, a control method therefor, and a storage medium.

Description of the Related Art

As a printing apparatus that forms ink dots on a printing medium to print an image, an inkjet printing apparatus of a so-called thermal system in which ink droplets are ejected by making use of thermal energy generated from a heating element is known. In the inkjet printing apparatus of the thermal system, the temperature of ink is an important parameter for maintaining the stability of ink ejection and maintaining a constant amount of ink to be ejected. This is because physical property values, such as the viscosity and surface tension of ink, vary depending on the temperature of ink, and as a result, the amount (ejection amount) of an ink droplet to be ejected and the ejection speed of an ink droplet vary. The ejection amount varies substantially linearly with respect to the temperature. When the temperature of ink is low, the ejection amount of ink is small, which may cause a decrease in printing density and density unevenness. In color printing, the color tone of an image varies. When the temperature of ink is low, the viscosity of ink is high, which may lead to a decrease in the ejection speed. When the viscosity of ink is extremely high, energy for ejecting ink droplets is insufficient, which may cause an ejection failure.

As a countermeasure against the issues raised when the temperature of ink is low, a control method for controlling the temperature of ink by heating or temperature retention is known. Examples of the control method include a method of heating ink by applying a voltage with a pulse width within a range in which no ink is ejected to the heating element, and a method of heating ink by providing a sub-heater separately from the heating element.

Japanese Patent Application Laid-Open No. 2012-240253 discusses a configuration for executing a printing operation even in a case where the temperature of ink falls outside a preset target temperature range when a printing job in which a specific printing mode is set is received.

As discussed in Japanese Patent Application Laid-Open No. 2012-240253, even when the temperature of ink is lower than a target temperature, a specific printing job is immediately started to thereby make it possible to reduce the time for completing a printing operation and to improve throughput.

SUMMARY

According to one embodiment, an inkjet printing apparatus includes a print head configured to print an image on a printing medium using a printing element configured to eject ink with thermal energy, a scanning unit configured to cause the print head to scan the printing medium, and a control unit configured to control scanning by the scanning unit and image printing by the print head based on an image printing instruction, wherein the control unit performs a control operation including executing a preliminary ejection to eject, from the print head, ink that does not contribute to image printing before an image is printed in one scanning operation, and determining an amount of ink to be ejected in the preliminary ejection based on a difference between a target temperature and a scanning start temperature, which is a temperature of the print head acquired in response to an instruction to start the one scanning operation.

Further features of the present disclosure will become apparent from the following description of example embodiments with reference to the attached drawings.

BRIEF DESCRIPTION OF THE DRAWINGS

FIG. 9 is a table illustrating a relationship between a target temperature and the number of preliminary ejections.

FIG. 11 is a table illustrating a relationship between a target temperature and a preliminary ejection driving pulse width.

DESCRIPTION OF THE EMBODIMENTS

A first example embodiment of the present disclosure will be described with reference to the drawings.

Figure 1A:
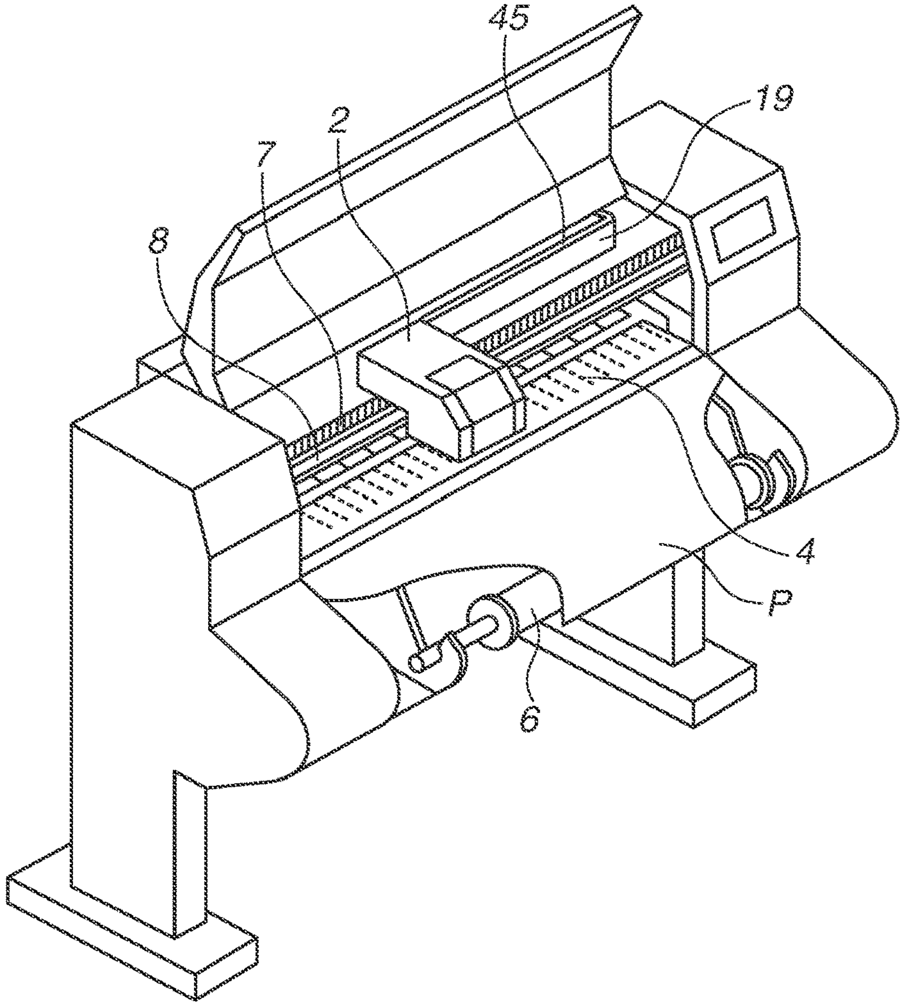
FIG. 1A is an external view of an inkjet printing apparatus according to a first example embodiment.
Figure 1B:
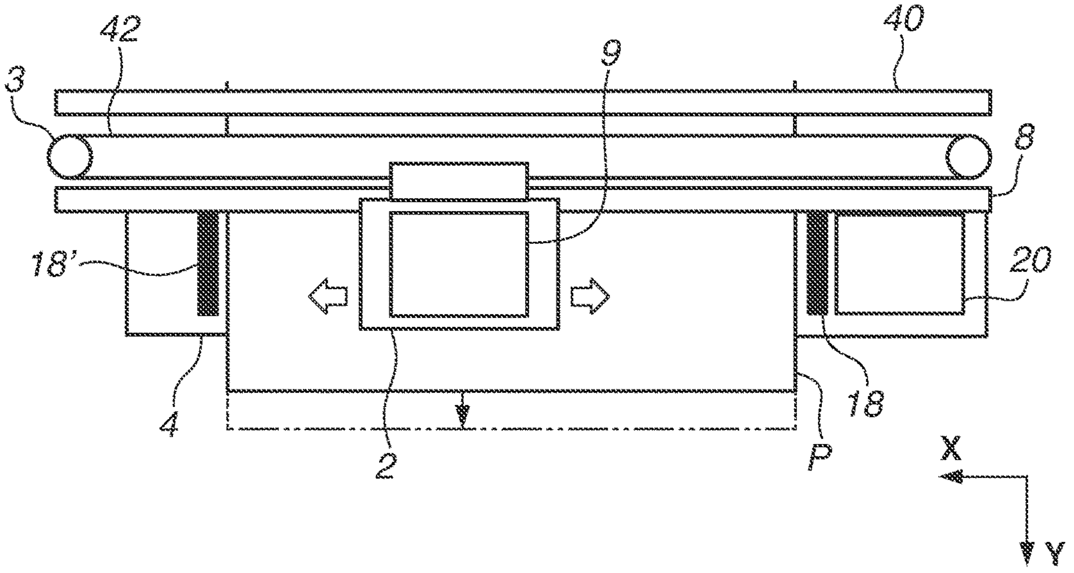
FIG. 1B is a schematic diagram illustrating an outline of a scanning area of a print head.

(1) Mechanical Structure of Inkjet Printing Apparatus (1-1) Outline of Apparatus FIGS. 1A and 1B illustrate an inkjet printing apparatus according to a first example embodiment of the present disclosure. FIG. 1A is an external view of the inkjet printing apparatus, and FIG. 1B is a schematic diagram illustrating an outline of a scanning area of a print head 9. The printing apparatus according to the present example embodiment is an inkjet printing apparatus of a so-called serial scan system in which an image is printed on a printing medium by applying ink while moving a print head in a main scanning direction that intersects with a conveyance direction in which a printing medium P is conveyed.

An outline of the configuration of the printing apparatus and a printing operation will be described with reference to FIGS. 1A and 1B.

The printing medium P is conveyed in the conveyance direction (Y-direction in the drawings) from a spool 6, which holds the printing medium P, by a sheet feed roller 40 that is driven by a sheet feed motor (not illustrated) via a gear. At a predetermined position, a carriage unit 2 (hereinafter also referred to as a carriage) is driven by a carriage motor 3 to perform scanning in a +X-direction and a −X-direction along a guide shaft 8.

The print head 9 is detachably mounted on the carriage unit 2. In the process of scanning with the carriage unit 2, an ejection operation for ejecting ink droplets from ejection ports (nozzles) provided in the print head 9 is performed at a timing based on a position signal obtained by an encoder 7. In one scanning operation, an image is printed on an area corresponding to a certain width (band width) corresponding to a range in which nozzles are arrayed. After that, the printing medium P is conveyed and an image corresponding to a subsequent band width is printed. In the printing apparatus according to the present example embodiment, it is possible to execute a method for printing an image by conveying a printing medium corresponding to a band width in each scanning operation, or a method for printing an image by conveying a printing medium after executing a number of scanning operations without conveying the printing medium corresponding to the band width in each scanning operation. It is also possible to execute so-called multipath printing in which a number of pieces of thinned-out data corresponding to a number of scanning operations are prepared based on image data, a printing medium corresponding to a 1/n band is conveyed in each scanning operation, and an image is printed by executing a number of scanning operations, thereby completing formation of an image on a unit area.

The print head 9 is provided with a flexible wiring substrate for supplying a signal pulse for ejection driving, a head temperature adjustment signal, and the like. The other end of the flexible wiring substrate is connected to a control circuit for controlling the printing apparatus.

A carriage belt 42 can be used to transmit a driving force from the carriage motor 3 to the carriage unit 2. Instead of using the carriage belt 42, any other driving system, such as a system including a lead screw that is rotationally driven by the carriage motor 3 and extends in the main scanning direction, and an engagement portion that is provided on the carriage unit 2 and engages with a groove of the lead screw, can be adopted.

The printing medium P is nipped between the sheet feed roller 40 and a pinch roller and is conveyed and guided to a printing position on a platen 4. At the printing position, an image is printed at a position opposed to the print head 9 that performs scanning. An area in which the print head 9 performs scanning is also referred to as a printing area. A face surface of the print head 9 is capped in an inactive state. Accordingly, when a printing start command is received, a cap 20 is taken off prior to printing, thereby bringing the print head 9 and the carriage unit 2 into a scanning ready state. When an amount of data corresponding to an amount of data to be printed in one scanning operation by the carriage unit 2 is stored in a buffer, the carriage unit 2 is driven by the carriage motor 3 to perform scanning and an image is printed on the printing area.

(1-2) Configuration of Print Head

Figure 2:
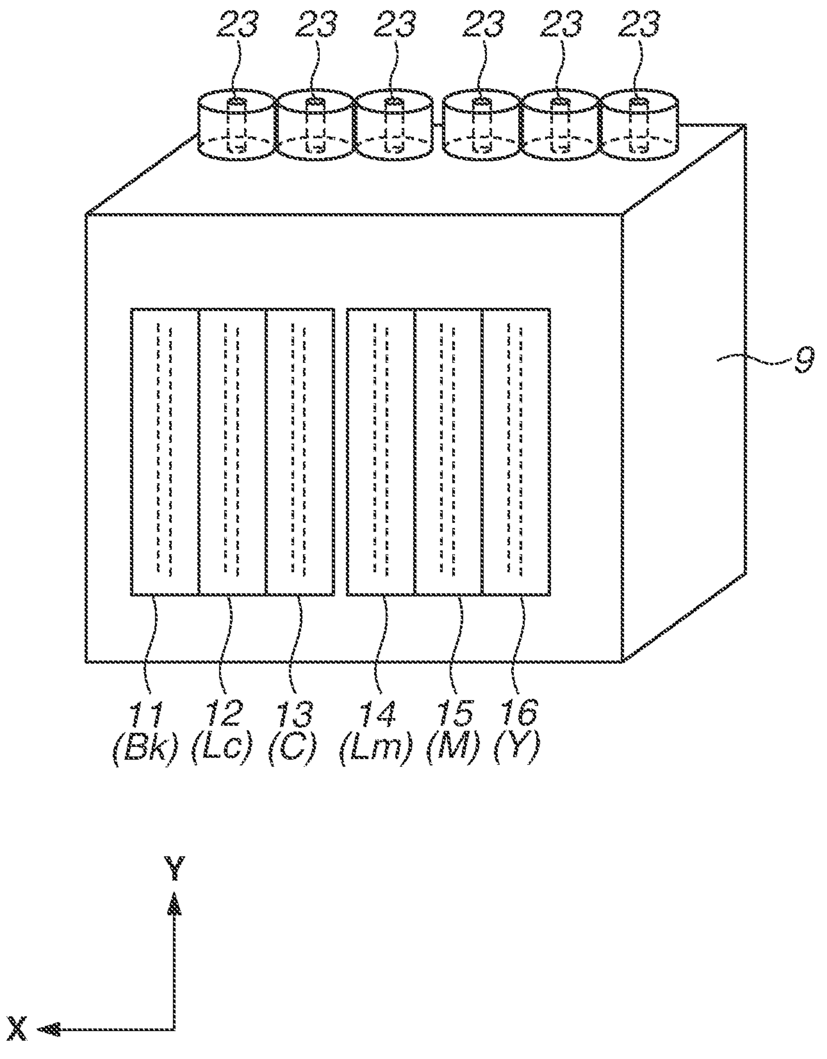
FIG. 2 is a schematic perspective view illustrating the print head.

FIG. 2 is a schematic perspective view illustrating the print head 9 mounted on the carriage unit 2 of the printing apparatus according to the present example embodiment as viewed from a direction in which ink is ejected. In the print head 9 illustrated in FIG. 2, a plurality of printing element arrays 11 to 16 configured to eject ink of different color tones (including color and density) in the main scanning direction (X-direction) is placed side by side on a support substrate 10. The print head 9 according to the present example embodiment includes the printing element arrays 11 to 16 corresponding to ink of colors of black (Bk), light cyan (Lc), cyan (C), light magenta (Lm), magenta (M), and yellow (Y), respectively. Ink is supplied from each ink introduction portion 23 through an ink flow channel in the print head 9 to the corresponding one of the printing element arrays 11 to 16. Ink is introduced into each ink introduction portion 23 through a tube from a corresponding ink tank to be described below.

Figure 3:
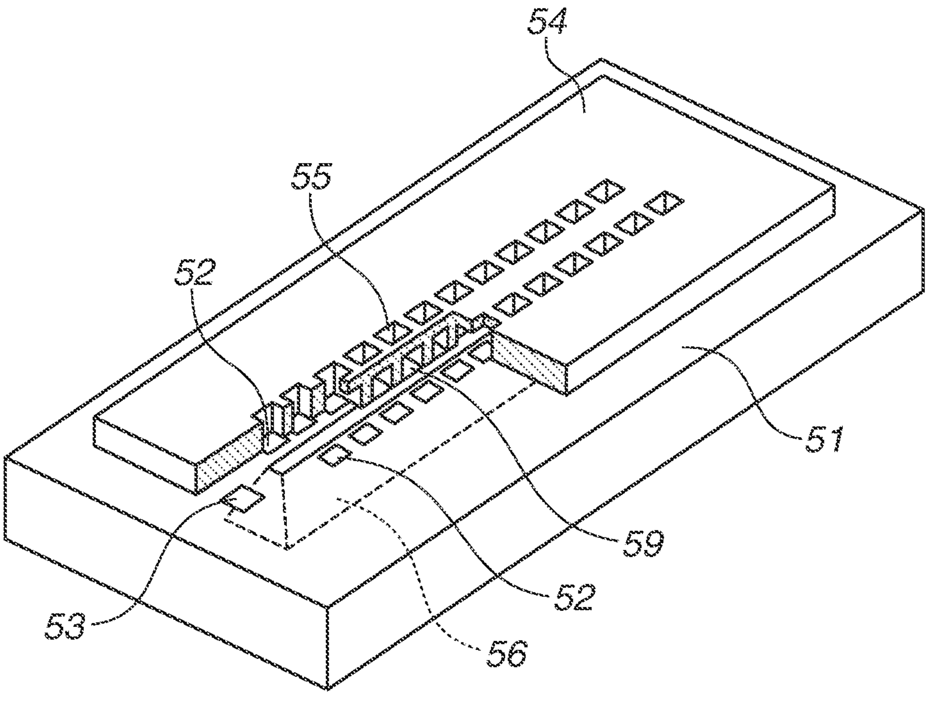
FIG. 3 is a schematic perspective view illustrating each printing element array.

FIG. 3 is a schematic perspective view illustrating each printing element array. Each printing element array portion is of a system using, for example, thermal energy for causing film boiling in ink in accordance with energization as energy to be used for ejecting ink. Each printing element array portion includes a substrate 51 on which two rows of printing element arrays in which heat generation units 52 each serving as a printing element are formed at a predetermined pitch are arranged side by side. On the substrate 51, a diode serving as a temperature sensor 53 for detecting the temperature of the substrate 51 is provided at an end in the array direction of the heat generation units 52. The diode is used for controlling ejection energy and for temperature-retention control of the print head 9. An ink supply port 56 that communicates with the ink flow channel is provided between the printing element arrays on the substrate 51. A member (orifice plate) 54 that is provided with nozzles 55 respectively corresponding to the heat generation units 52 each serving as a printing element and ink paths 59 that correspond to the nozzles 55, respectively, and are used to supply ink from the ink supply port 56 is bonded to the substrate 51.

In each row, the heat generation units 52 and the nozzles 55 are shifted by half a pitch, thereby achieving a desired printing resolution. In this case, the printing element arrays 11 to 16 may have the same printing density and may include the same number of nozzles, or may have different printing densities and may include different numbers of nozzles. In the present example embodiment, 1280 nozzles are arranged at a density of about 490 nozzles per 1 cm for each color in the printing element arrays 11 to 16.

In the present example embodiment, the printing element arrays use a system in which the heat generation units 52 eject ink vertically with respect to the substrate 51. Alternatively, a system using an ejection portion configured to eject ink in a parallel direction may be used.

(2) Configuration Example of Control System

Figure 4:
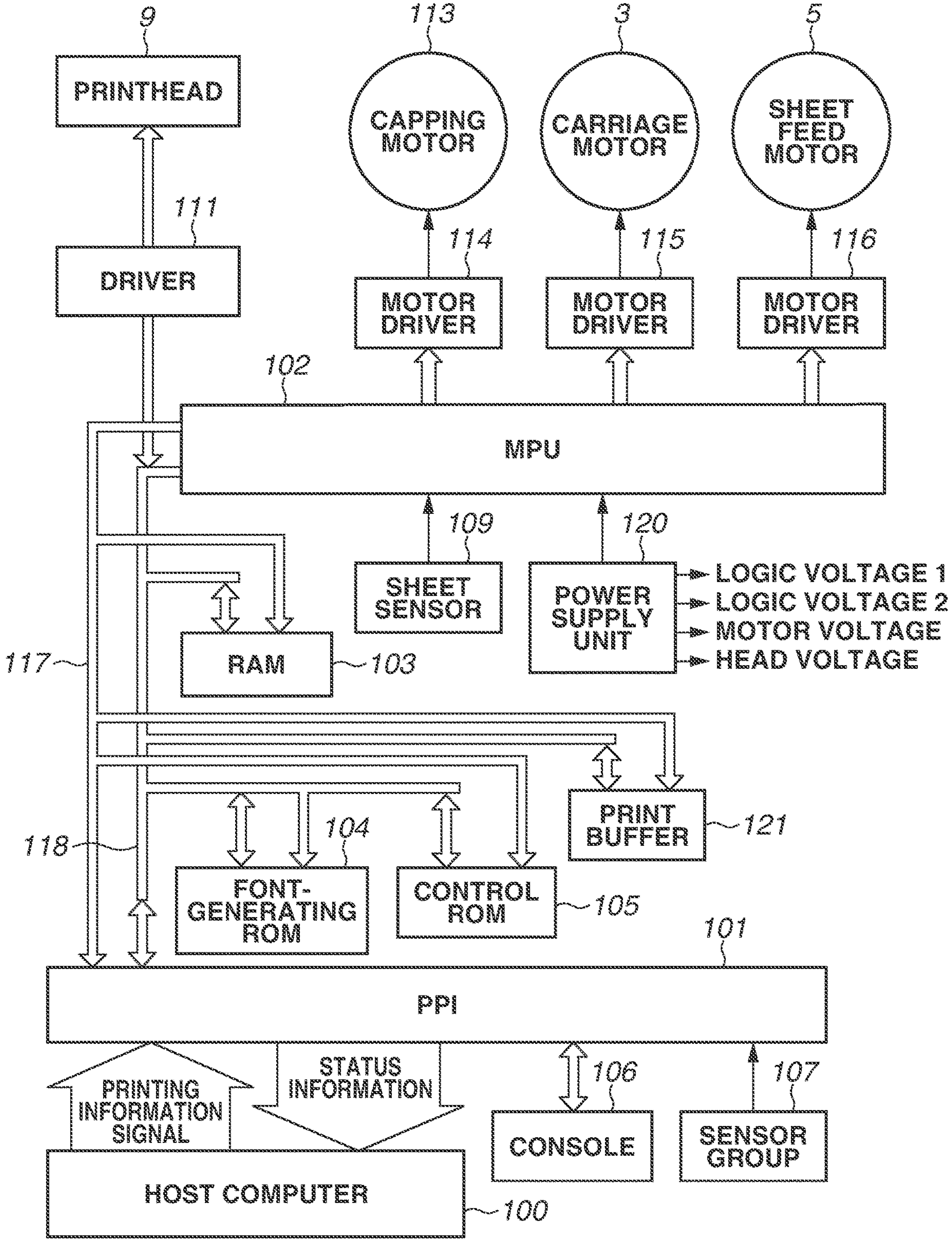
FIG. 4 is a block diagram illustrating a configuration example of a control circuit.

FIG. 4 is a block diagram illustrating a configuration example of the control circuit in the printing apparatus according to the present example embodiment. A programmable peripheral interface (PPI) 101 receives a command signal (command) sent from a host computer 100 and a printing information signal including print data, and transfers the signals to a micro processing unit (MPU) 102. The PPI 101 also delivers status information about the printing apparatus, as needed, to the host computer 100. Further, the PPI 101 inputs and outputs data via a console 106. The console 106 includes a setting input unit used for a user to make various settings on the printing apparatus, and a display unit that displays a message for the user. The PPI 101 also receives an input of signals from a home position sensor for detecting that the carriage unit 2 and the print head 9 are located at a home position, and from a sensor group 107 including a capping sensor.

The MPU 102 controls each unit in the printing apparatus based on control programs stored in a control read-only memory (ROM) 105. A random access memory (RAM) 103 stores received signals, or is used as a work area for the MPU 102 and temporarily stores various data. A fontgenerating ROM 104 stores pattern information such as text and print data corresponding to code information, and outputs various pattern information corresponding to the input code information. A print buffer 121 is a print buffer for storing print data loaded to the RAM 103 or the like, and has a capacity corresponding to printing of a plurality of rows. The control ROM 105 can store not only the above-descried control programs but also fixed data corresponding to data or the like for use in a control process to be described below. These components are controlled by the MPU 102 via an address bus 117 and a data bus 118.

Motor drivers 114, 115, and 116 are motor drivers for driving a capping motor 113, the carriage motor 3, and a sheet feed motor 5, respectively, under control of the MPU 102. In step S203, a sheet sensor 109 detects whether a printing medium is present, or whether a printing medium is supplied to a position where printing can be performed by the print head 9. A driver 111 drives the heat generation units 52 of the print head 9 in response to the printing information signal. A power supply unit 120 supplies power to each of the units described above, and includes a battery and an alternating current (AC) adapter as a driving power supply device.

In a printing system including the printing apparatus and the host computer 100 that supplies the printing information signal to the printing apparatus, the host computer 100 transmits print data via a parallel port, an infrared port, a network, or the like. In this case, a required command is added to the head portion of the print data. Examples of the command to be added include information indicating the type of a printing medium on which an image is printed, the size of a printing medium, a printing quality, a sheet feed path, and information indicating whether to automatically discriminate an object. Examples of information indicating the type of a printing medium include the type of a printing medium, such as plain paper, an overhead projector (OHP) sheet, and glossy paper, and the type of a special printing medium, such as a transfer film, thick paper, and banner paper. Examples of information indicating the size of a printing medium include A0-size, A1-size, A2-size, B0-size, B1-size, and B2-size. Examples of information indicating the printing quality include draft, high-quality, medium-quality, highlighting of a specific color, and the type of monochrome/color. Information indicating the sheet feed path is determined depending on the configuration and type of a printing medium feeding unit included in the printing apparatus. Examples of information indicating the sheet feed path include an auto sheet feeder (ASF), a manual sheet feeder, a sheet feed cassette 1, and a sheet feed cassette 2. In the case of employing a structure for applying process liquid to improve the ink fixing property on a printing medium, information or the like for determining whether to apply the process liquid can be transmitted as a command.

According to these commands, data for printing is read from the ROM 105 described above and an image is printed based on the data in the printing apparatus. Examples of the data include data for determining the number of printing paths for multipass printing described above, the ejection amount of ink per printing medium unit area, a printing direction, and the like. Examples of the data also include the type of a mask for data thinning applied to multipass printing, driving conditions (e.g., the shape of a driving pulse to be applied to the heat generation units 52 and an application time) for the print head 9, a dot size, conditions for conveyance of a printing medium, the number of colors to be used, and a carriage speed.

(Characteristic Configuration)

A characteristic control configuration in the inkjet printing apparatus according to the present example embodiment will be described.

Figure 5:
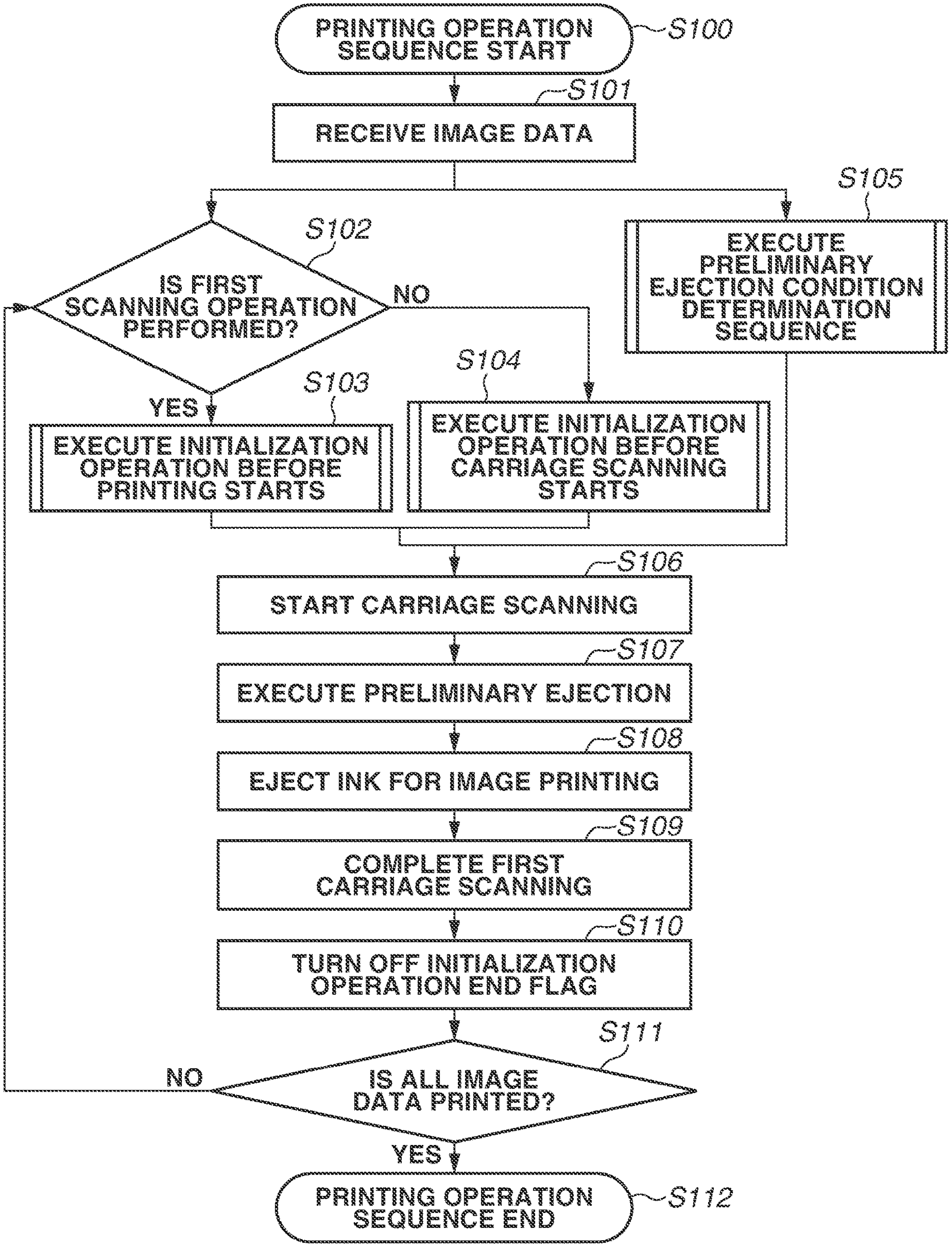
FIG. 5 is a flowchart illustrating a printing operation flow.

FIG. 5 is a flowchart illustrating a printing operation flow for the inkjet printing apparatus according to the present example embodiment. First, in step S100, a command instructing image printing is received from the host computer 100. In step S101, image data for printing is received from the host computer 100. In step S102, the MPU 102 determines whether a first scanning operation is to be performed. If the first scanning operation is to be performed (YES in step S102), the processing proceeds to step S103. In step S103, the MPU 102 executes an initialization operation before carriage scanning starts so that various control components can be used for image printing. The initialization operation is described below with reference to FIG. 6. In parallel with the initialization operation, a preliminary ejection condition determination sequence that is a characteristic configuration of the present disclosure is executed in step S105. The preliminary ejection condition determination sequence is described below with reference to FIG. 8. When the initialization operation in step S103 is completed and it is confirmed that an initialization operation end flag is turned on, carriage scanning is started in step S106. Drying and thickening of ink in the vicinity of the nozzles 55 of the print head 9 progress during a series of initialization operations, which may cause an ejection failure. In order to prevent the ejection failure, immediately before an image is printed on a printing medium, a preliminary ejection (flushing) that does not contribute to image printing is executed to discharge the thickened ink. The preliminary ejection to be executed before image printing is performed toward ink receivers (preliminary ejection receivers) 18 and 18' that are respectively disposed at both ends of the platen 4 and disposed on the outside of an area in which an image is printed. The preliminary ejection receiver 18 is disposed between a forward scanning start position of the carriage unit 2 and an image printing area, and the preliminary ejection receiver 18' is disposed between a backward scanning start position and the image printing area. With the configuration, the carriage unit 2 can execute the preliminary ejection while moving to the image printing area for image printing.

In step S107, the preliminary ejection is executed while the carriage unit 2 is being moved for scanning. In step S108, ink for printing an image on a printing medium is ejected. In step S109, carriage scanning in the first scanning operation is completed. After completion of carriage scanning, in step S110, the initialization operation end flag is turned off so as to execute the initialization operation for the subsequent scanning operation. After that, in step S111, the MPU 102 determines whether there is any image data left in the print buffer 121. If there is image data left in the print buffer 121, or if printing of all image data is not finished (NO in step S111), the processing returns to step S102 to execute the initialization operation before carriage scanning starts in step S104 and to execute the preliminary ejection condition determination sequence in the same manner as in the first scanning operation. After completion of the initialization operation, the subsequent scanning operation is started. In step S111, if it is determined that there is no image data left, or if printing of all image data is finished (YES in step S111), the printing operation in this flowchart ends in step S112.

Figure 6:
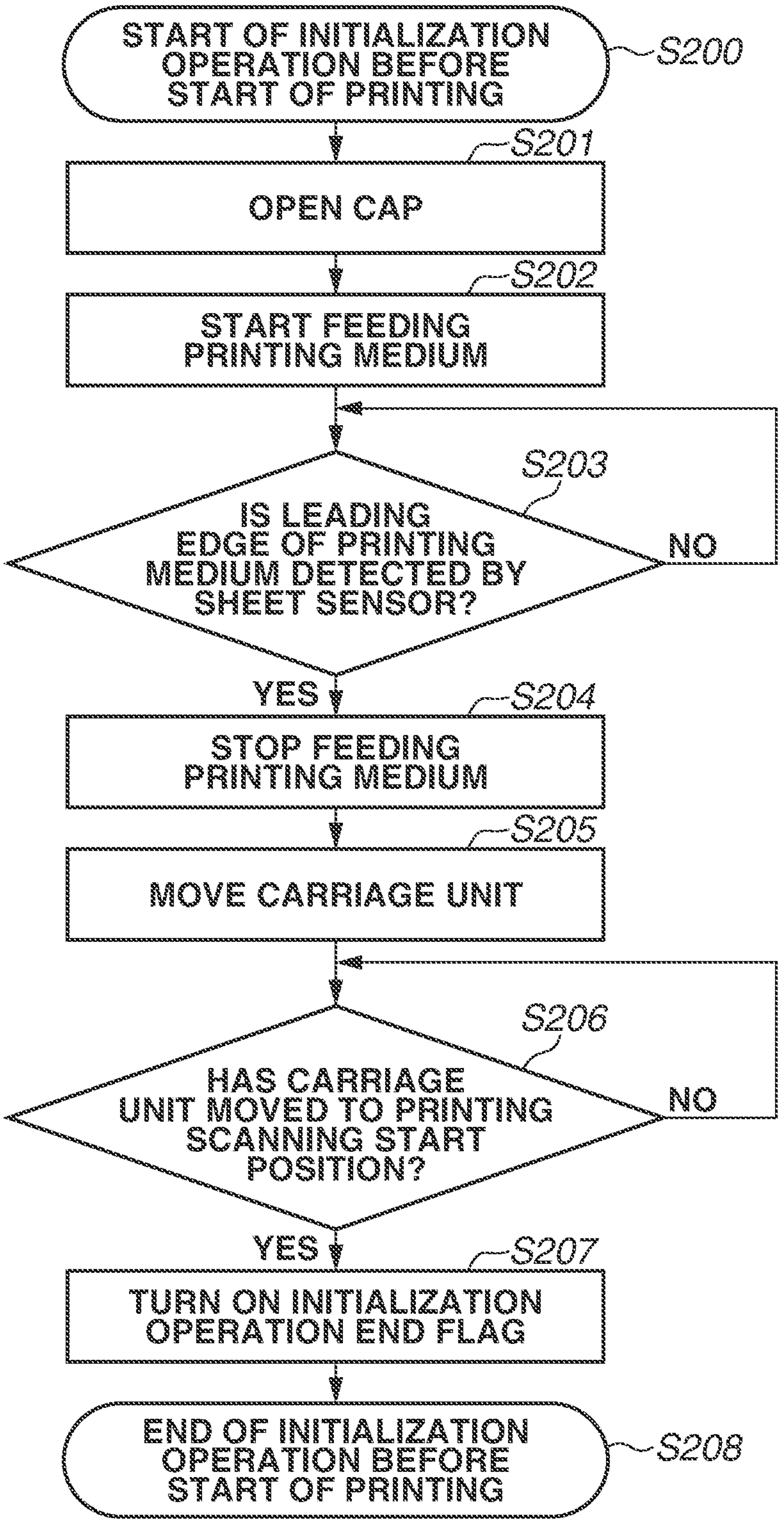
FIG. 6 is a flowchart illustrating an initialization operation before printing starts.

FIG. 6 is a flowchart illustrating the initialization operation before start of the first scanning operation in the printing operation sequence illustrated in FIG. 5. Upon receiving image data in step S101, in step S201, the MPU 102 drives the capping motor 113 via the motor driver 114 and causes the print head 9 and the cap 20 to be spaced apart to thereby bring the carriage unit 2 into a movable state. Next, in step S202, the MPU 102 drives the sheet feed motor 5 via the motor driver 116 and starts to feed the printing medium. If the sheet sensor 109 detects that the leading edge of the printing medium is fed and conveyed to a position where an image can be printed (YES in step S203), the processing proceeds to step S204. In step S204, feeding of the printing medium is stopped. After the printing medium is conveyed to the position where an image can be printed, in step S205, the carriage unit 2 is moved to a printing scanning start position. After completion of movement of the carriage unit 2 in step S206, the initialization operation is completed. In step S207, the initialization operation end flag is turned on. Then, the initialization operation to be executed before start of printing ends in step S208.

Figure 7:
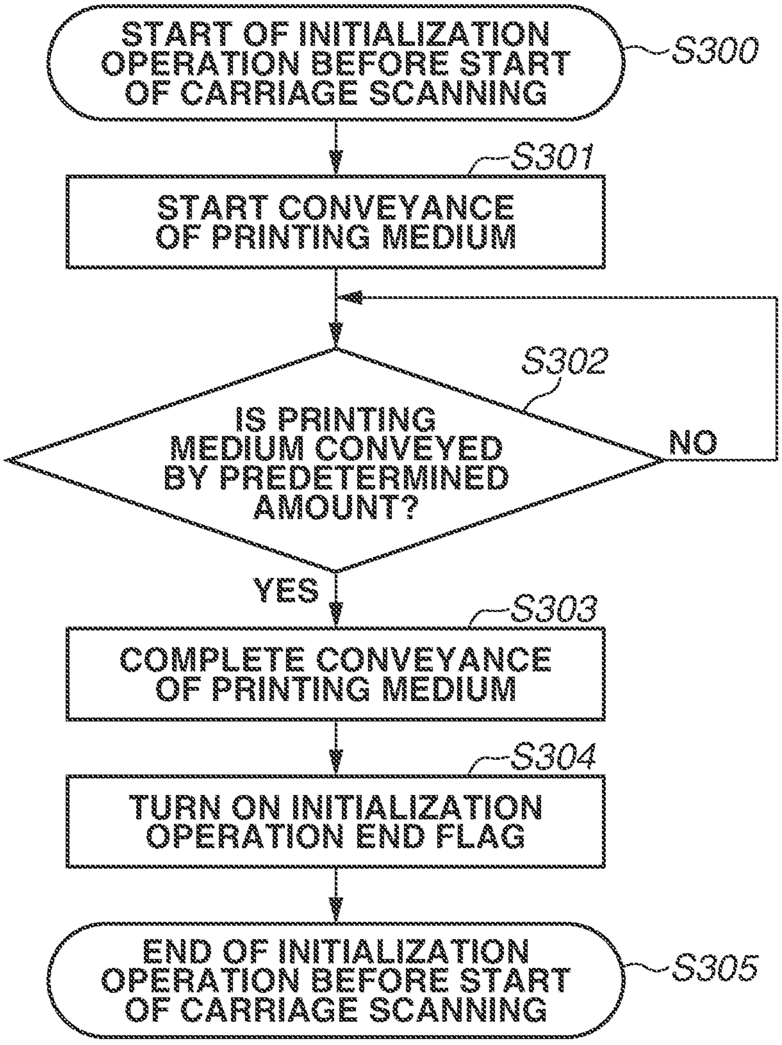
FIG. 7 is a flowchart illustrating an initialization operation before start of carriage scanning.

FIG. 7 is a flowchart illustrating the initialization operation before start of carriage scanning to be executed in second and subsequent scanning operations in the printing operation sequence illustrated in FIG. 5. After completion of image printing by carriage scanning in the previous scanning operation, in step S301, the MPU 102 starts to convey the printing medium. In step S302, the printing medium is conveyed by an amount corresponding to a printing mode executed during the printing operation. After conveyance of the printing medium is completed in step S303, it is determined that preparation for image printing in the subsequent scanning operation is completed. In step S304, the initialization operation end flag is turned on. Then, the initialization operation to be executed before start of carriage scanning ends in step S305. In a printing mode in which the printing medium is not conveyed before the subsequent scanning operation is executed after completion of the previous carriage scanning operation, the step of turning on the initialization operation end flag may be executed and the other steps may be skipped.

Figure 8:
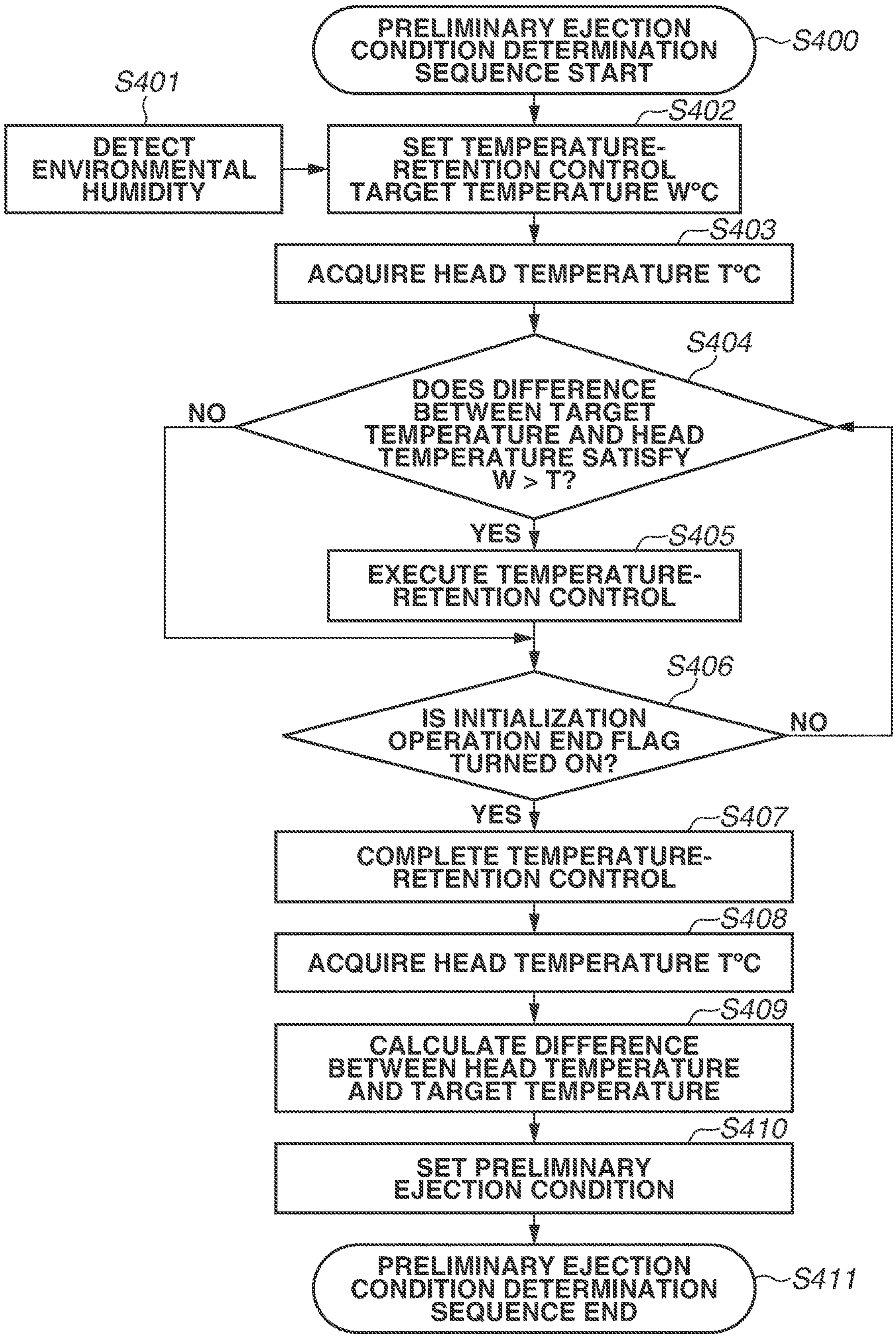
FIG. 8 is a flowchart illustrating a preliminary ejection condition determination sequence.

FIG. 8 is a flowchart illustrating the preliminary ejection condition determination sequence in the printing operation sequence illustrated in FIG. 5. As described above, the processing flow is executed in parallel with the initialization operation before start of image printing as described with reference to FIGS. 6 and 7.

First, in step S401, humidity information is obtained from an environmental humidity sensor (not illustrated) for measuring the humidity in an environment in which the printing apparatus body is installed. In step S402, the MPU 102 reads a table that defines a relationship between a target temperature and the number of preliminary ejections and is held in the ROM 105, and sets a target temperature W° C. for temperature-retention control. In step S403, the temperature sensor 53 provided on the substrate 51 of the print head 9 acquires a temperature T° C. in the vicinity of the print head 9. In step S404, the set target temperature W° C. and the temperature T° C. in the vicinity of the print head 9 are compared and the difference between the two temperatures is acquired. If the temperature T° C. in the vicinity of the print head 9 is lower than the target temperature W° C., that is, if the temperature difference is equal to or more than "0" (YES in step S404), the processing proceeds to step S405. In step S405, the temperature-retention control for the print head 9 is started. The temperature-retention control according to the present example embodiment is a control operation for heating ink by applying a voltage with a pulse width within a range in which no ink is ejected to a heating element serving as a printing element.

When the initialization operation to be executed in parallel with the sequence is completed and it is confirmed that the initialization operation end flag is turned on in step S406, preparation for the operation to be executed before start of the printing operation is completed. In this case, if the method by which the temperature-retention control is continued until the temperature T° C. in the vicinity of the print head 9 reaches the target temperature W° C. is employed, the initialization operation can be completed first, and as a result, the printing operation cannot be started and a time for waiting for the temperature in the vicinity of the print head 9 to rise is generated.

In the present example embodiment, in step S407, the above-described temperature-retention control is completed at the same time when the initialization operation end flag is turned on. In step S408, the temperature T° C. in the vicinity of the print head 9 at this timing is acquired. The temperature T° C. in the vicinity of the print head 9 acquired when the initialization operation is completed is referred to as a scanning start temperature. In step S409, a difference between the temperature T° C. in the vicinity of the print head 9, which is the acquired scanning start temperature, or the temperature T° C. in the vicinity of the print head 9 at this point of time, and the target temperature W° C. is calculated with reference to the table stored in the ROM 105. In step S410, depending on the calculated temperature difference, a preliminary ejection condition for executing the preliminary ejection is set.

If image printing is started at a low temperature before the temperature in the vicinity of the print head 9 reaches the target temperature W° C., an adverse effect may occur on an image due to an ejection failure as described above. Accordingly, in the present example embodiment, the number of preliminary ejections to be executed on the preliminary ejection receiver 18 immediately before image printing is increased, thereby accelerating a temperature rise in the print head 9 due to the execution of preliminary ejections. Thus, since the temperature in the vicinity of the print head 9 during image printing immediately after the preliminary ejections are executed can be increased to a temperature at which no ejection failure occurs, which results in preventing the occurrence of an adverse effect on an image.

FIG. 9 is an example of the table illustrating the relationship between the target temperature and the number of preliminary ejections. The table is held in the ROM 105. In the present example embodiment, when the environmental humidity is 40% or more, the target temperature W° C. is set to 40° C. Under the condition, the control operation is performed in such a way that eight preliminary ejections per nozzle are executed when the temperature T° C. in the vicinity of the print head 9 before execution of the preliminary ejection is higher than the target temperature W° C., and the number of preliminary ejections is increased depending on the temperature difference when the temperature T° C. in the vicinity of the print head 9 is lower than the target temperature W° C. The control operation like this enhances the effect of increasing the temperature T° C. in the vicinity of the print head 9 due to the preliminary ejection when the temperature difference is large and enables printing of an image on a printing medium in a state where no ejection failure occurs.

On the other hand, when the environmental humidity is less than 40%, moisture in ink is more likely to be evaporated from the nozzles 55, so that ink in the vicinity of the nozzles 55 is thickened. For this reason, it may be desirable to decrease the viscosity of ink by increasing the temperature in the vicinity of the print head 9. Accordingly, in the present example embodiment, the target temperature W° C. is set to 50° C. In this case, unlike in the case of setting the target temperature W° C. to 40° C., it may be necessary to execute a number of preliminary ejections for obtaining the effect of increasing the temperature in the vicinity of the print head 9. For example, when the temperature T° C. in the vicinity of the print head 9 is 40° C., it may be necessary to execute 12 preliminary ejections per nozzle so as to increase the temperature T° C. by 5° C. When the temperature T° C. in the vicinity of the print head 9 is 50° C., it may be desirable to execute 16 preliminary ejections per nozzle so as to increase the temperature T° C. by 5° C. Accordingly, when the target temperature W° C. is set to 50° C., the number of preliminary ejections set depending on the difference between the target temperature W° C. and the temperature T° C. in the vicinity of the print head 9 is larger than the number of preliminary ejections set when the target temperature W° C. is 40° C. at the same temperature difference.

Figure 10A:
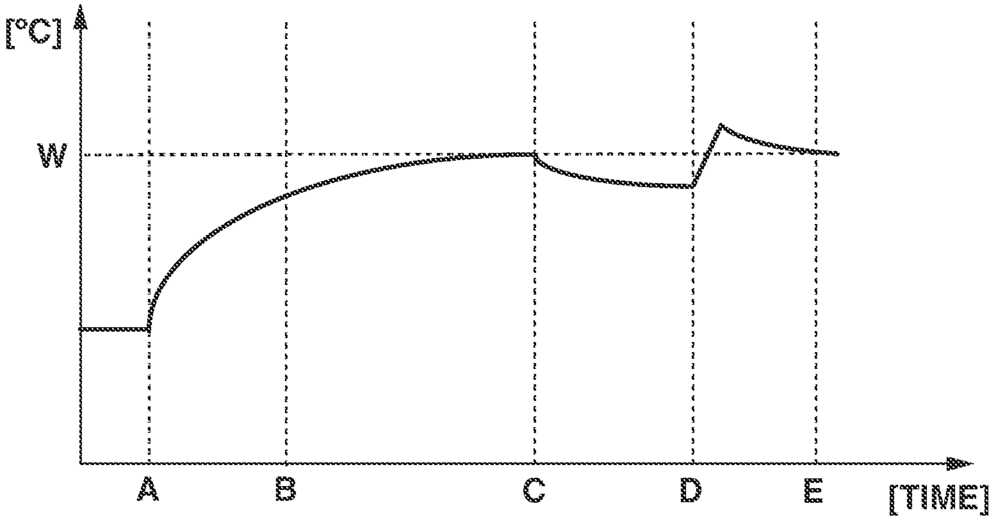
FIGS. 10A and 10B are graphs each illustrating changes in temperature in the vicinity of the print head when a preliminary ejection is executed.
Figure 10B:
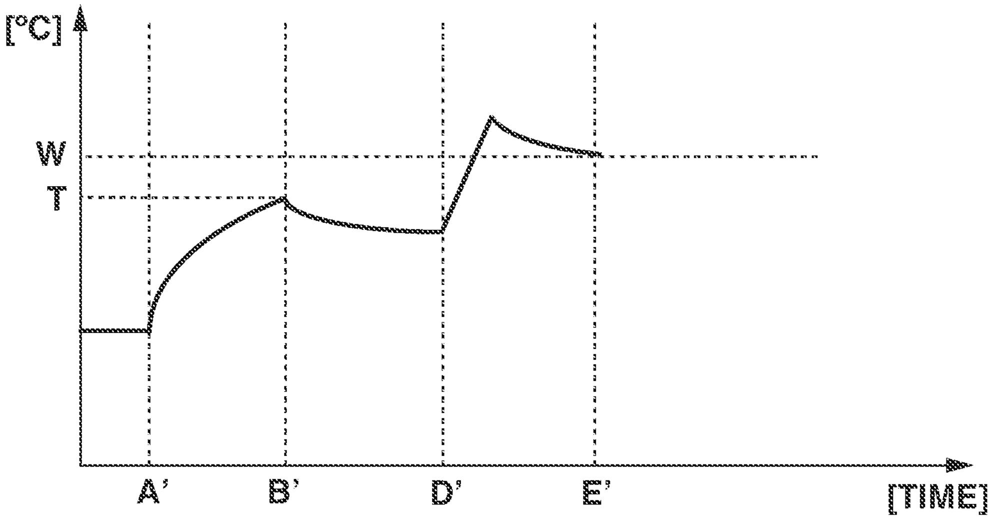

FIGS. 10A and 10B are graphs each illustrating changes in temperature in the vicinity of the print head 9 when the number of preliminary ejections is controlled based on the difference between the target temperature W° C. and the temperature T° C. in the vicinity of the print head 9 according to the present example embodiment. FIG. 10A illustrates a comparison example illustrating changes in temperature in the vicinity of the print head 9 when carriage scanning is started after waiting for the temperature T° C. in the vicinity of the print head 9 to reach the target temperature W° C. At a timing A when a printing start instruction is input, the temperature T° C. in the vicinity of the print head 9 is lower than the target temperature W° C., and thus the temperature-retention control is started. At a timing B when the initialization operation end flag is turned on, the temperature T° C. in the vicinity of the print head 9 has not reached the target temperature W° C. Accordingly, the temperature-retention control is continued in a carriage standby state without starting carriage scanning. At a timing C, the temperature T° C. in the vicinity of the print head 9 finally reaches the target temperature W° C., and thus the temperature-retention control is finished and the carriage unit 2 starts scanning. At a timing D, the preliminary ejection to be executed before start of image printing is executed on the preliminary ejection receiver 18. As seen from FIG. 10A, the temperature in the vicinity of the print head 9 slightly decreases during a period from a time when the temperature-retention control is finished at the timing C to a time when the preliminary ejection is executed at the timing D. However, the temperature rises to a temperature higher than the target temperature W° C. due to the preliminary ejection. After that, when the carriage unit 2 moves to a position where ink droplets can be applied onto the printing medium, the ink ejection for image printing is started at a timing E.

FIG. 10B is a graph illustrating changes in temperature in the vicinity of the print head 9 when the control operation according to the present example embodiment is applied. Similarly to FIG. 10A, the temperature in the vicinity of the print head 9 at a timing A' is lower than the target temperature W° C., and thus the temperature-retention control is started. At a timing B', the initialization operation end flag is turned on. At this timing, the temperature-retention control is finished and the value of the temperature T° C. in the vicinity of the print head 9 at the timing B' is acquired from the temperature sensor 53. Scanning with the carriage unit 2 is started, and at a timing D', the printing medium reaches the position of the preliminary ejection receiver 18. In this case, a number of preliminary ejections corresponding to the difference between the target temperature W° C. and the temperature T° C. in the vicinity of the print head 9 acquired at the timing B' are executed. Since the number of preliminary ejections in FIG. 10B is larger than that in FIG. 10A, the effect of increasing the temperature can be obtained even when the difference between the target temperature W° C. and the temperature T° C. in the vicinity of the print head 9 is large. In FIG. 10B, the temperature in the vicinity of the print head 9 rises above the target temperature W° C., and after that, the temperature T° C. in the vicinity of the print head 9 can almost reach the target temperature W° C. when ink is applied onto the printing medium at a timing E'. As a result of experiments conducted by the present inventors, it has turned out that when the temperature difference is 5° C. in an environment at a room temperature of 25° C. and a humidity of 43%, the application of the control operation according to the present example embodiment makes it possible to start carriage scanning four seconds earlier than in the case of waiting for the temperature T° C. in the vicinity of the print head 9 to reach the target temperature W° C.

As described above, the preliminary ejection condition is set depending on the difference between the temperature T° C. in the vicinity of the print head 9 and the target temperature W° C. In this case, when the temperature T° C. in the vicinity of the print head 9 is lower than the target temperature W° C., the number of preliminary ejections is increased depending on the temperature difference, thereby making it possible to accelerate a temperature rise in the vicinity of the print head 9 due to the execution of preliminary ejections and to prevent deterioration in image quality during image printing after the preliminary ejections. In this case, the control operation is performed in such a way that the number of preliminary ejections is increased as the temperature difference increases, thereby dealing with a case where the temperature in the vicinity of the print head 9 is much lower. Carriage scanning can be immediately started without waiting for the temperature in the vicinity of the print head 9 to reach the target temperature. Consequently, deterioration in throughput can be prevented.

In the present example embodiment, the control operation is performed in such a way that the target temperature and the number of preliminary ejections are changed depending on the environmental humidity. However, the same advantageous effects can be obtained also by performing the control operation regardless of the humidity.

In the present example embodiment, the control operation is performed by setting the condition for each scanning operation not only in the preliminary ejection prior to the first scanning operation, but also in the preliminary ejection in the second and subsequent scanning operations, but instead the control operation may be performed by changing only the preliminary ejection prior to the first scanning operation. It is also possible to employ a configuration in which the control operation of the related art in which carriage scanning is not started before the temperature in the vicinity of the print head reaches the target temperature is executed without changing the condition for the preliminary ejection prior to the first scanning operation, and the control operation according to the present example embodiment is executed in the second and subsequent scanning operations. The control operation according to the present example embodiment is executed before at least one scanning operation, which leads to an improvement in throughput.

A second example embodiment will be described. In the first example embodiment, the control operation is performed by changing the number of preliminary ejections.

However, in the case of executing the preliminary ejections while scanning with the carriage unit 2 is being executed, it may be necessary to increase the width of the preliminary ejection receivers 18 and 18' as the number of preliminary ejections increases. According to the second example embodiment, in the case of setting the preliminary ejection condition, the waveform of a driving pulse to be applied to each printing element for preliminary ejection is changed without changing the number of preliminary ejections. With this configuration, energy to be applied to each printing element can be increased and thus the effect of increasing the temperature in the vicinity of the print head 9 can be increased. The description of a control operation similar to that of the first example embodiment is omitted.

FIG. 11 is a table illustrating a relationship between a target temperature and a preliminary ejection driving pulse width according to the present example embodiment. The table is held in the ROM 105. In the present example embodiment, so-called single-pulse driving is performed using a single rectangular wave as a driving pulse for preliminary ejection.

First, when the environmental humidity is 40% or more, the target temperature W° C. is set to 40° C. Under this condition, when the temperature T° C. in the vicinity of the print head 9 before execution of the preliminary ejection is higher than the target temperature W° C., the width of the driving pulse to be applied for the preliminary ejection is 0.762 μsec. On the other hand, when the temperature T° C. in the vicinity of the print head 9 is lower than the target temperature W° C., the width of the driving pulse is controlled to be increased as the difference between the temperatures increases. For example, the width of the driving pulse when the temperature difference is in a range from 0° C. to 5° C. is 0.800 μsec, and the width of the driving pulse when the temperature difference is in a range from 5° C. to 10° C. is 0.838 μsec. When the environmental humidity is less than 40%, the target temperature W° C. is set to 50° C. Under this condition, the amount of energy for obtaining the effect of increasing the temperature in the vicinity of the print head 9 due to the preliminary ejection is larger than that when the target temperature is set to 40° C. Accordingly, when the target temperature is set to 50° C., the width of the driving pulse for preliminary ejection depending on the difference between the target temperature W° C. and the temperature T° C. in the vicinity of the print head 9 is increased as compared with the case where the target temperature W° C. is 40° C.

As described above, when the difference between temperature T° C. in the vicinity of the print head 9 and the target temperature W° C. is large, the amount of energy per unit time to be applied to each printing element upon execution of the preliminary ejection is increased, thereby making it possible to print an image in a state where no ejection failure occurs, while enhancing the effect of increasing the temperature in the vicinity of the print head 9. Printing can be immediately started even when the temperature in the vicinity of the print head 9 has not reached the target temperature, which leads to an improvement in throughput.

In the present example embodiment, the control operation is performed using a single rectangular wave (single pulse) as the waveform of the driving pulse for the preliminary ejection. Alternatively, divided pulses (double pulses) for applying pulses in the order of a preheat pulse, an interval time, and a main heat pulse can be adopted. The width of each of the preheat pulse and the main heat pulse may be changed depending on the difference between the target temperature and the temperature in the vicinity of the print head 9, or the interval time may be changed. Any change may be made as long as a temperature rise in the print head 9 due to the preliminary ejection can be accelerated by changing the waveform of the driving pulse.

As a method for increasing the energy per unit time to be applied to each printing element upon execution of the preliminary ejection, a method of increasing input energy per unit time by increasing the ejection frequency as the temperature difference increases may be employed.

Alternatively, a method of increasing the temperature in the vicinity of the print head 9 by increasing the total amount of ink to be ejected upon execution of the preliminary ejection may be employed. Examples of the method of increasing the total amount of ink to be ejected include a method of increasing the preliminary ejection frequency as the temperature difference increases, and a method of increasing a time for executing the preliminary ejection as the temperature difference increases. To enhance the effect of increasing the temperature in the vicinity of the print head 9 with the same preliminary ejection time when it is difficult to increase the time for the preliminary ejection depending on the scanning speed, it is effective to increase the ejection frequency.

A third example embodiment will be described. According to the third example embodiment, the temperature-retention control is continued until the temperature in the vicinity of the print head 9 reaches a predetermined temperature, instead of immediately stopping the temperature-retention control when the difference between the target temperature and the temperature in the vicinity of the print head 9 is extremely large in the preliminary ejection condition determination sequence. The description of a control operation similar to that of the above-described example embodiments is omitted.

Figure 12:
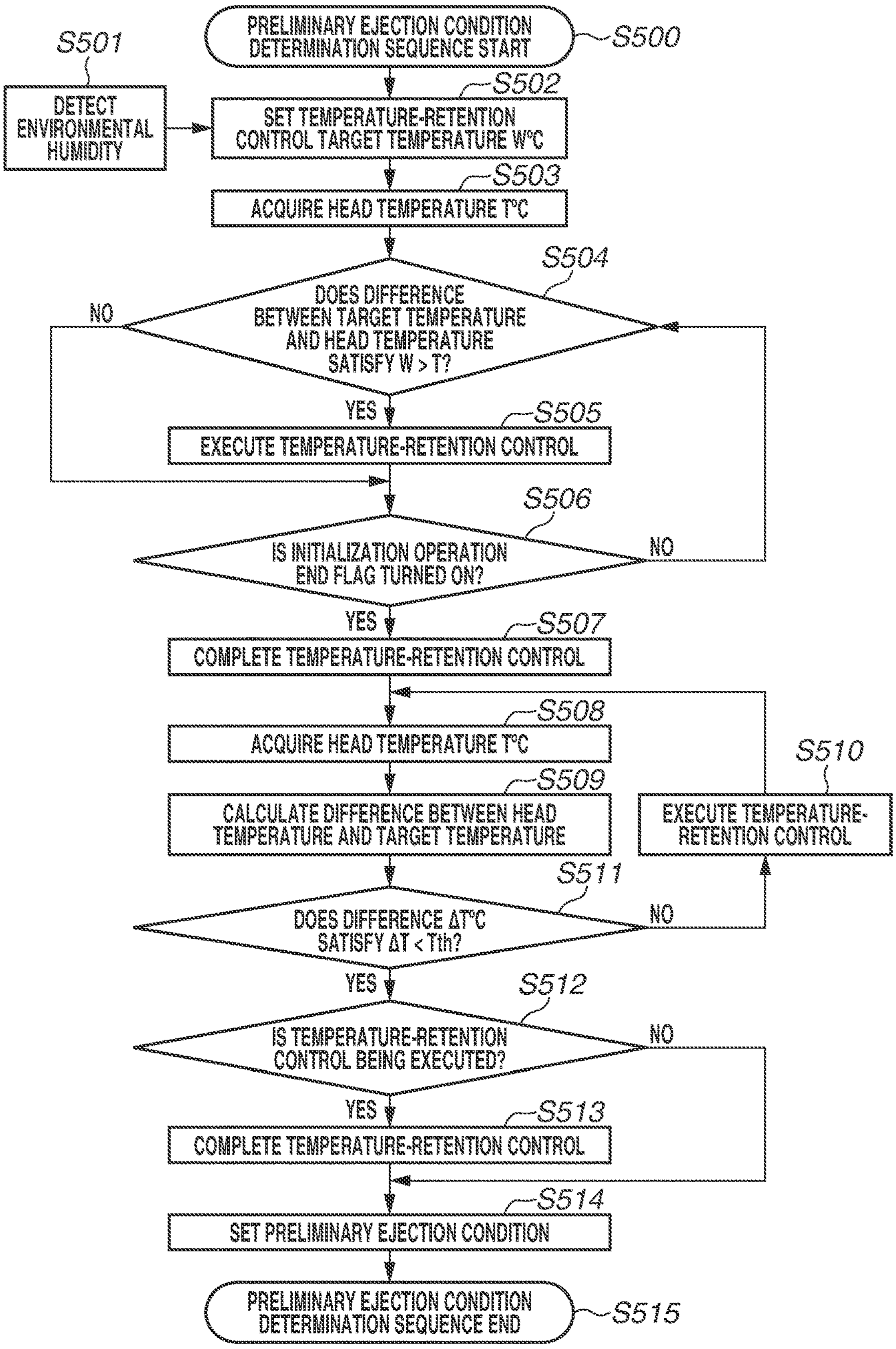
FIG. 12 is a flowchart illustrating the preliminary ejection condition determination sequence.

FIG. 12 is a flowchart illustrating a preliminary ejection condition determination sequence according to the present example embodiment. In the first example embodiment, the control operation is performed in such a way that the temperature-retention control is stopped after it is confirmed that the initialization operation end flag is turned on. However, if the temperature in the vicinity of the print head 9 is extremely low, it may be difficult to set the temperature in the vicinity of the print head 9 to be closer to the target temperature only by the preliminary ejection to be subsequently executed. Therefore, in the present example embodiment, the difference between the temperature T° C. in the vicinity of the print head 9 and the target temperature W° C. is determined in step S509. Based on the result of the determination, if it is determined that a difference ΔT° C. is more than or equal to a predetermined threshold Tth in step S511 (NO in step S511), the processing returns to step S510. In step S510, the temperature-retention control is executed again. If the temperature in the vicinity of the print head 9 is increased due to the temperature-retention control and the difference ΔT° C. is smaller than the predetermined threshold Tth, the effect of increasing the temperature in the vicinity of the print head 9 due to the execution of the preliminary ejection is sufficiently enough to avoid an ejection failure. Therefore, in step S513, the temperature-retention control is stopped, and in step S514, an appropriate preliminary ejection condition is set.

According to the control operation described above, in a case where it is determined that the temperature in the vicinity of the print head 9 is extremely low and an ejection failure cannot be avoided only by the effect of increasing the temperature in the vicinity of the print head 9 due to the execution of the preliminary ejection, the temperature-retention control is stopped and scanning is started at a time when conditions for continuing the temperature-retention control and maintaining the stable ejection state are satisfied. Also, in this case, the printing operation can be started even when the temperature in the vicinity of the print head 9 has not reached the target temperature. Consequently, the advantageous effect of improving the throughput can be obtained.

If the absolute value of the temperature in the vicinity of the print head 9 is less than or equal to a predetermined threshold, a control operation for continuing the temperature-retention control may be performed. The same advantageous effects can be obtained by any control operation, as long as the temperature-retention control can be continued until the conditions for ensuring the stable ejection state are satisfied.

Other example embodiments will be described. The temperature-retention control and heating control according to the example embodiments described above use the method of heating ink by applying a voltage with a pulse width within a range in which no ink is ejected to each printing element. Alternatively, a method of heating ink by providing a heater separately from the heating element may be used. In this case, the step of completing the temperature-retention control in step S407 illustrated in FIG. 8 may be skipped, and heating by the heater may be continued until ink is ejected to the preliminary ejection receivers 18 and 18'.

In the above-described example embodiments, the temperature T° C. in the vicinity of the print head 9 is acquired by acquiring the temperature of the temperature sensor 53 provided on the substrate 51 of the print head 9. However, the method of acquiring the temperature T° C. is not limited to this method. The temperature of the temperature sensor 53 may be written into a memory every predetermined period and values stored in the memory may be acquired.

The above-described example embodiments illustrate a configuration in which the number of preliminary ejections, i.e., the number of ejections of ink droplets, is set as the preliminary ejection condition. However, the present invention is not limited to this configuration and any configuration may be employed as long as the temperature T° C. in the vicinity of the print head 9 can be increased by the preliminary ejection. Any other method, such as a method of setting the number of ink droplets to be ejected, or a method of setting a period for which ink droplets are ejected, can be employed.

In the above-described example embodiments, the timing when the temperature in the vicinity of the print head 9 to be compared with the target temperature is acquired is set as the timing when step S408 is executed after the temperature-retention control in step S407. However, the timing for acquiring the temperature in the vicinity of the print head 9 for setting the preliminary ejection condition is not limited to this timing. The temperature in the vicinity of the print head 9 may be acquired at any timing between a time when the printing operation sequence is started upon reception of an image printing instruction to a time when the preliminary ejection is executed in step S107. The temperature in the vicinity of the print head 9 may be acquired and the preliminary ejection condition may be set immediately before the preliminary ejection is executed. As described above, the temperature in the vicinity of the print head 9 may be acquired before scanning starts, and the preliminary ejection condition may be set in consideration of a decrease in the temperature in the vicinity of the print head 9 during a movement to the position of each of the preliminary ejection receivers (ink receivers) 18 and 18'.

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2020-181985, filed Oct. 30, 2020, which is hereby incorporated by reference herein in its entirety.

What is claimed is:

1. An inkjet printing apparatus comprising:

a print head configured to print an image on a printing medium using a printing element configured to eject ink with thermal energy;

a scanning unit configured to cause the print head to scan the printing medium in a direction that intersects with a direction in which the printing medium is conveyed; and a control unit configured to control scanning by the scanning unit and image printing by the print head based on an image printing instruction, wherein the control unit performs a control operation including:

executing, as part of a first scanning operation, a preliminary ejection process to eject, from the print head, ink that does not contribute to image printing, before performing an ink ejection process to print an image on the printing medium as part of the first scanning operation; and determining an amount of ink to be ejected during the preliminary ejection process based on a difference between a target temperature and a scanning start temperature, the scanning start temperature being a temperature measured at the print head in response to an instruction to start the first scanning operation, wherein the preliminary ejection process begins at a time when the measured scanning start temperature is lower than the target temperature.

2. The inkjet printing apparatus according to claim 1, wherein in a case where the scanning start temperature is lower than the target temperature, the control unit executes the preliminary ejection process in a manner that takes into account depending on the difference between the target temperature and the scanning start temperature.

3. The inkjet printing apparatus according to claim 2, wherein in a case where the difference between the target temperature and the scanning start temperature is a first value, the control unit executes the preliminary ejection process to eject a first number of ink droplets, and in a case where the difference between the target temperature and the scanning start temperature is a second value greater than the first value, the control unit executes the preliminary ejection process to eject a second number of ink droplets, the second number being greater than the first number.

4. The inkjet printing apparatus according to claim 2, wherein in a case where the difference between the target temperature and the scanning start temperature is a first value, the control unit executes the preliminary ejection process to eject a first amount of ink as a total amount of ink to be ejected, and in a case where the difference between the target temperature and the scanning start temperature is a second value greater than the first value, the control unit executes the preliminary ejection process to eject a second amount of ink as the total amount of ink to be ejected, the second amount of ink being larger than the first amount of ink.

5. The inkjet printing apparatus according to claim 4, wherein in a case where the difference between the target temperature and the scanning start temperature is the first value, the control unit executes the preliminary ejection process at a first frequency, and in a case where the difference between the target temperature and the scanning start temperature is the second value, the control unit executes the preliminary ejection process at a second frequency higher than the first frequency.

6. The inkjet printing apparatus according to claim 4, wherein in a case where the difference between the target temperature and the scanning start temperature is the first value, the control unit executes the preliminary ejection process for a first period of time, and in a case where the difference between the target temperature and the scanning start temperature is the second value, the control unit executes the preliminary ejection process for a second period of time longer than the first period of time.

7. The inkjet printing apparatus according to claim 2, wherein in a case where the difference between the target temperature and the scanning start temperature is a first value, the control unit executes the preliminary ejection process at a first frequency for a first period of time, and in a case where the difference between the target temperature and the scanning start temperature is a second value greater than the first value, the control unit executes the preliminary ejection process at a second frequency for the first period of time, the second frequency being higher than the first frequency.

8. The inkjet printing apparatus according to claim 2, wherein in a case where the difference between the target temperature and the scanning start temperature is a first value, the control unit executes the preliminary ejection process to cause the printing element to generate a first energy in one ejection, and in a case where the difference between the target temperature and the scanning start temperature is a second value greater than the first value, the control unit executes the preliminary ejection process to cause the printing element to generate a second energy in one ejection, the second energy being larger than the first energy.

9. The inkjet printing apparatus according to claim 8, wherein a length of a driving pulse to be applied to the printing element in a case where the printing element is caused to generate the second energy is longer than a length of a driving pulse to be applied to the printing element in a case where the printing element is caused to generate the first energy.

10. The inkjet printing apparatus according to claim 1, wherein the control unit acquires the scanning start temperature during a period from a time when an image printing instruction is input to a time when the preliminary ejection process is executed.

11. The inkjet printing apparatus according to claim 1, wherein the control unit acquires, as the scanning start temperature, a temperature at a timing when the one scanning operation is started by the scanning unit.

12. The inkjet printing apparatus according to claim 1, wherein the control unit executes a heating control for increasing a temperature of the print head in response to an image printing instruction.

13. The inkjet printing apparatus according to claim 12, wherein the control unit executes the heating control by causing the printing element to generate thermal energy within a range in which no ink droplets are ejected.

14. The inkjet printing apparatus according to claim 13, wherein the control unit suspends the heating control before the first scanning operation is started.

15. The inkjet printing apparatus according to claim 12, further comprising a heating unit configured to increase the temperature of the print head, wherein the heating control is executed by the heating unit.

16. The inkjet printing apparatus according to claim 1, further comprising a detection unit configured to detect a temperature of the print head, wherein the control unit acquires the temperature detected by the detection unit, as the scanning start temperature.

17. The inkjet printing apparatus according to claim 1, further comprising:

a detection unit configured to detect a temperature of the print head; and a storage unit configured to store the temperature detected by the detection unit, wherein the control unit acquires the temperature stored in the storage unit and uses the stored temperature as the scanning start temperature.

18. The inkjet printing apparatus according to claim 1, wherein upon detecting that the printing medium is present at a position for image printing in a scanning operation and the scanning unit is located at a scanning start position after a second scanning operation has been completed, the second scanning operation occurring prior to the first scanning operation, the control unit controls the scanning unit to start the first scanning operation even in a case where a temperature of the print head is lower than the target temperature.

19. The inkjet printing apparatus according to claim 1, further comprising an ink receiver configured to receive ink that has been ejected in the preliminary ejection process for ejecting, from the print head, ink that does not contribute to image printing.

20. The inkjet printing apparatus according to claim 1, wherein the control unit executes the preliminary ejection process further based on a humidity measurement acquired at the start of the first scanning operation.

21. The inkjet printing apparatus according to claim 1, wherein the control unit executes the preliminary ejection process while causing the scanning unit to perform scanning.

22. A control method for an inkjet printing apparatus, the inkjet printing apparatus including a print head configured to print an image on a printing medium using a printing element configured to eject ink with thermal energy, and a scanning unit configured to cause the print head to scan the printing medium in a direction that intersects with a direction in which the printing medium is conveyed, the control method comprising:

acquiring an image printing instruction; and executing, as part of a first scanning operation, a preliminary ejection process to eject, from the print head, ink that does not contribute to image printing before performing an ink ejection process to print an image on the printing medium as part of the first scanning operation, wherein an amount of ink to be ejected during the preliminary ejection process is determined based on a difference between a target temperature and a scanning start temperature, the scanning start temperature being a temperature measured at the print head upon start of the first scanning operation, wherein the preliminary ejection process begins at a time when the measured scanning start temperature is lower than the target temperature.

* * * * *